June 7, 1966     C. W. ARMSTRONG     3,254,625
APPARATUS FOR PRODUCING A FLUIDIZED BED OF PULVERANT MATERIAL
Filed March 31, 1960     2 Sheets-Sheet 1
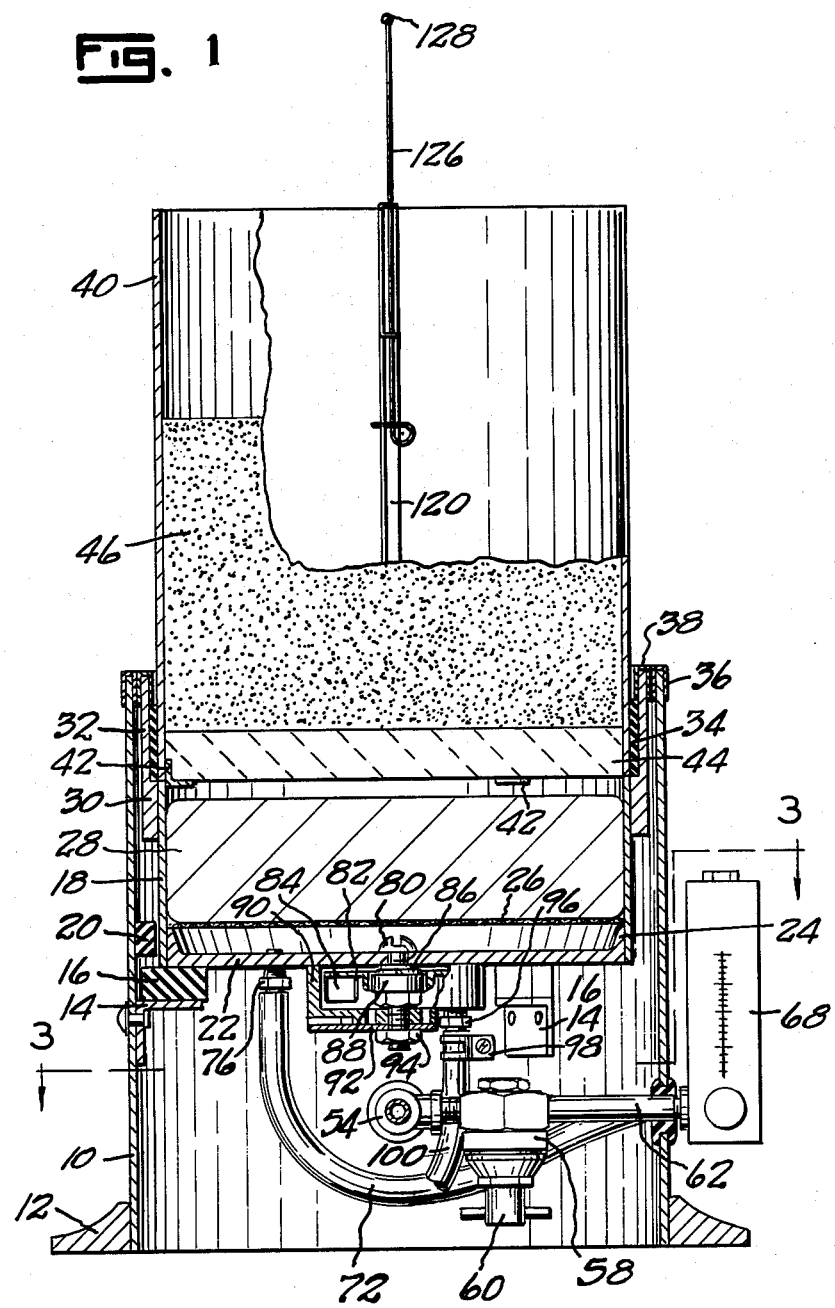
INVENTOR.
CECIL W. ARMSTRONG
BY Eugene C. Knoblock
ATTORNEY

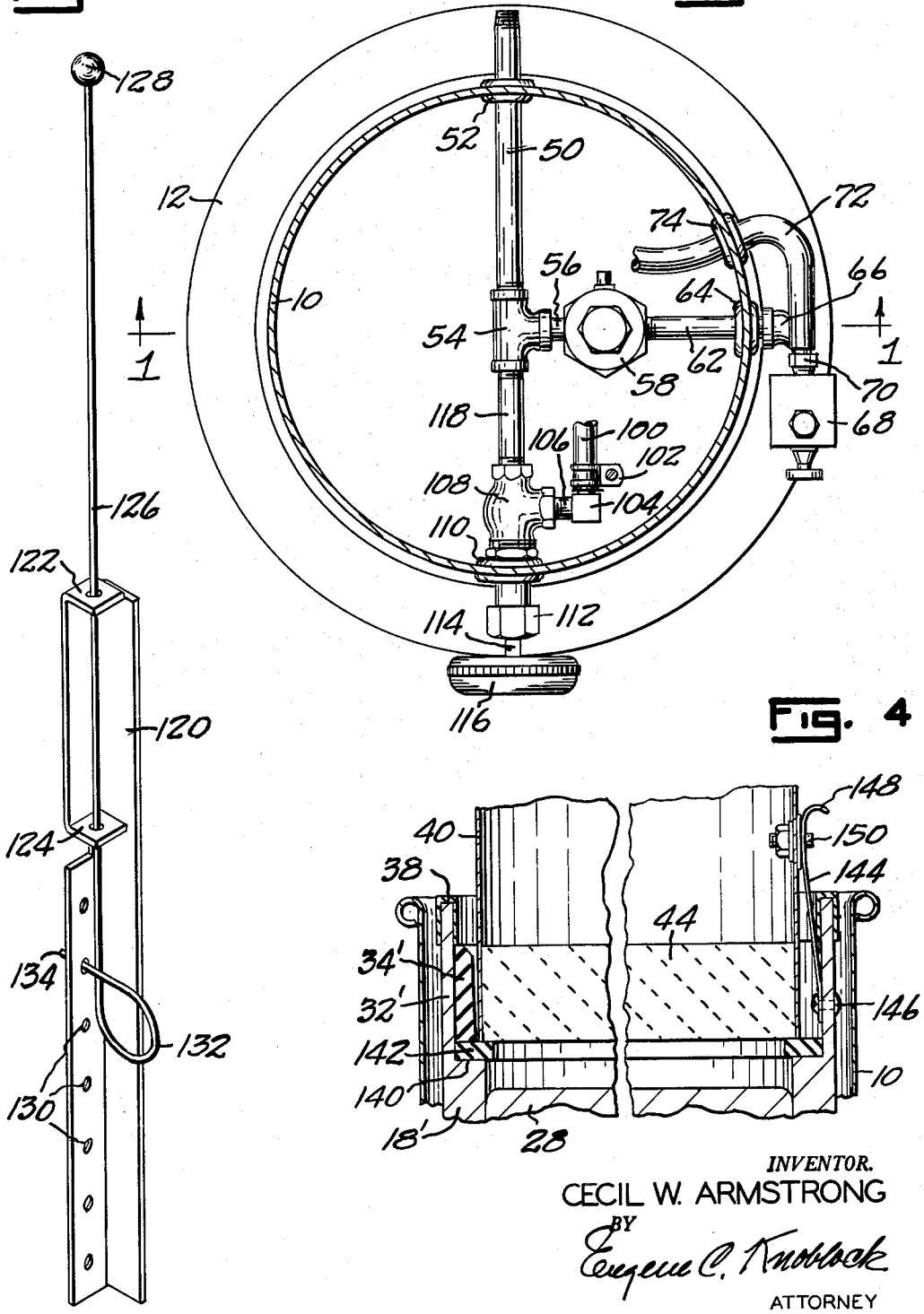

United States Patent Office 3,254,625
Patented June 7, 1966

3,254,625
APPARATUS FOR PRODUCING A FLUIDIZED BED
OF PULVERANT MATERIAL
Cecil W. Armstrong, Argonne Road, Warsaw, Ind.
Filed Mar. 31, 1960, Ser. No. 18,987
7 Claims. (Cl. 118—612)

This invention relates to a method and apparatus for producing a fluidized bed of pulverant material, and more particularly to a method and apparatus for applying protective coatings of pulverant or granular material in dry state.

The primary object of the invention is to provide a method of producing a fluidized bed which will prevent channeling of the bed, avoid localized blowing of the material of the bed above the surface of the bed, reduce the density of the bed incident to flow of a given quantity of gas therethrough, avoid loss due to blowing of pulverant or granular material from an open topped dip tank, and maintain a substantially constant density of the bed and a substantially uninterrupted and level top surface.

A further object is to provide a method of this character wherein a bed of finely divided particles of solid material is simultaneously subjected to the passage of air or other gas therethrough while supported upon a gas-diffusing base through which the gas is directed, and simultaneously agitating or vibrating the bed in a manner and at a rate to maintain a substantially uniform low density of the material forming the bed, and thereby accommodate dipping of an article in the bed with negligible resistance.

A further object is to provide a method of this character wherein air or other gas is directed through a bed of finely divided particles of solid material after having successively passed through a desiccant to abstract moisture therefrom and a diffuser to insure substantially uniform penetration of the gas throughout the entire volume of the bed.

A further object is to provide apparatus for producing a fluidized bed of finely divided particles of dry coating material which is of a simple and inexpensive construction, which provides control for the rate of flow of gas or air through the bed and by means of which a protective or other coating may be applied to an object immersed in the bed with assured uniformity without requiring manipulation of the object in the bed.

A further object is to provide a device of this character with means for vibrating a bed of finely divided particles of solid material while diffused air is being passed through said bed.

A further object is to provide a device of this character with means for vibrating a bed of finely divided particles of solid material at a regulated frequency within a wide range of frequencies.

A further object is to provide a device of this character with adjustable means for vibrating the same and with simple and inexpensive means for indicating the attainment of any one of a number of predetermined frequency rates by the apparatus as a result of adjustment of said vibrating means.

A further object is to provide a device of this character having a novel means for absorbing moisture contained in air or gas passed through the device and consisting of a flexible container formed of air pervious material confining a desiccant therein and capable of withstanding heat required for oven drying thereof and of the desiccant contained therein.

Other objects wil be apparent from the following specification.

Preferred apparatus constituting embodiments of the invention for carrying out the method is illustrated in the drawings, wherein FIG. 1 is a vertical sectional view of one embodiment of the invention taken on line 1—1 of FIG. 3;

FIG. 2 is an enlarged perspective detail view of a vibration rate indicator forming a part of the device;

FIG. 3 is a horizontal sectional view taken on line 3—3 of FIG. 1; and

FIG. 4 is a fragmentary vertical sectional view illustrating another modified embodiment of the invention.

Referring to the drawings, and particularly to FIGS. 1 to 3, which illustrate one embodiment of apparatus for practice of the method of the invention, the numeral 10 designates a tubular body or frame which is positioned with its axis upright and is open at its upper end. An annular base member 12 preferably encircles the lower end of the frame 10 and projects outwardly therefrom to provide stable positioning thereof. The member 12 may be of any selected dimension and mass to provide a firm support for the frame 10. Intermediate the height of the frame 10 are mounted support means, such as a plurality of brackets 14 projecting inwardly of the frame and each supporting a block of resilient material 16, such as rubber or synthetic rubber.

A receptacle assembly or carrier fits with clearance within the upper portion of the tubular frame 10, and includes a tubular member 18 resting upon the resilient blocks or supports 16 and terminating below the upper end of the frame 10. A plurality of resilient blocks 20 are preferably carried by the frame 10 adjacent and above the level of the carrier supports 16 and project inwardly of the frame 10. The blocks 20 are preferably of a thickness slightly less than the spacing between the inner surface of the frame 10 and the outer surface of the tubular member 18 and serve to center the tubular member 18. The carrier is preferably cup-shaped. Thus the lower end of the tubular member 18 is closed by a bottom plate 22 which preferably has an annular upwardly projecting flange 24 fitting within the lower end of the tubular member 18. A wire screen or other reticulated member 26 is supported at its margin spaced above the bottom plate 22, as upon the top of the flange 24, and spans the tubular member 18. A desiccant container filled with a desiccant material and designated generally by the numeral 28 is supported upon the screen 26 and substantially spans the tubular member 18. The desiccant container and the desiccant therein will preferably be of a character which will permit the passage or flow of air therethrough. Thus the desiccant container may constitute a flexible bag formed of woven glass fibers, and the desiccant therein may constitute silica jell.

The upper part of the tube 18 of the carrier carries an annular member 30 which fits with clearance within the base or frame tube 10 and has a reduced thickness upper annular part 32 extending above the member 18 to a level approximately equal to the level of the top of the frame 10. The upwardly projecting reduced thickness carrier portion 32 is preferably lined by a ring 34 of resilient material whose inner diameter is preferably substantially equal to the outer diameter of tube 18. The upper margin of the tubular frame 10 may mount a resilient ring 36 of U-shaped cross-section and a similar resilient ring 38, also U-shaped in cross-section, may be mounted upon the upper end of the reduced thickness flange 32. Where rings 36 and 38 are used, the ring 38 fits with slight clearance within the ring 36. The ring or rings 36, 38 are adapted to cushion the shock incident to contact of the carrier with the frame during vibration.

A dip tank is supported upon the tubular member 18 of the carrier within the annular part 32 which preferably receives the tank with a sealed fit. The dip tank preferably comprises an open-ended tube 40 of substantially the same diameter as the tubular member 18 of the carrier and bears thereon in edge abutment, being retained in accurate position thereon by its snug fit within the resilient ring 34. A plurality of spaced brackets 42 are carried by the lower end of the tube 40 and project inwardly therefrom. The brackets 42 serve to support a porous diffuser plate or membrane 44 which serves as the bottom of the dip tank. Plate 44 has a snug fit within the tube 40 and serves to support in the dip tank a body of pulverant, finely divided or granular dry solid material 46 which is to constitute the fluidized bed contained by the device. The plate 44 preferably constitutes a porous ceramic material which is not glazed and which is of substantially uniform thickness throughout and is capable of affording substantially uniform diffusion therethrough of air or other gas directed thereagainst under pressure.

Means are provided for supplying a regulated flow or rate of supply of air or gas into the device. As here shown, an air supply conduit 50 passes through an opening in the tubular frame 10 lined by a resilient grommet 52. The outer end of the conduit 50 is adapted for connection with a blower or other source of air or gas under pressure (not shown). In the construction shown in FIG. 3, the conduit 50 is connected to a T-fitting 54 with which is also connected a nipple 56. The nipple 56 is connected to a regulator or valve 58, preferably provided with manually operable adjusting handle means 60 and capable of regulating the rate of flow of air or other gas therethrough. Conduit 62 communicates with regulator 58 and preferably passes through the wall of the tubular frame 10, as through a resilient grommet 64. At its outer end the conduit 62 mounts an L or other fitting 66 with which it is connected and upon which may be supported a flow meter 68. The flow meter 68 preferably constitutes a calibrated flow gauge accommodating visual observation of the rate of flow of gas or air therethrough. A fitting 70 at the outlet of the gauge 68 provides means for connecting a conduit 72 to the gauge. The conduit 72 passes through an opening in the tubular frame 10, as through a resilient grommet 74. The conduit 72 preferably constitutes a flexible hose which communicates with a nipple or fitting 76 mounted in an opening in the bottom plate 22 of the receptacle assembly which mounts the desiccant container 28. It will be understood that any suitable valve means may be provided in the air supply line to open and close the line with respect to the supply of air or other gas therethrough.

Means are provided for vibrating the receptacle assembly 18, 22 and the dip tank 40, 44, in a manner to impart movement or vibration having a horizontal component. In the construction here illustrated, the vibrating means is pneumatic and is supported by a member 80, such as a machine screw passing through an opening in the center of the bottom 22 of the carrier or receptacle assembly. The member 80 has an enlarged head bearing upon the upper face of the bottom member 22. A rotor 82 is rotatable upon the upright stem of the member 80 in slightly eccentric relation and is preferably provided with a plurality of vanes 84 adjacent its periphery. Washers 86 are interposed between the rotor 82 and the bottom panel 22. Anti-friction bearing means 88 preferably serve to journal the eccentric 82, 84. A housing 90 encloses the eccentric member 82 and is provided with apertures adapted to be spanned or partially spanned by a muffler plate 92. The housing 90 and muffler plate 92 may be mounted in operative relation to the bottom plate 22 of the carrier by means of a nut 94 threaded on the member 80.

An air hose nipple 96 is mounted in an aperture in the eccentric housing 90 at a position to direct air against the vanes 84 of the eccentric rotor. A hose clamp 98 serves as a means to connect a flexible hose 100 to the nipple 96. At its opposite end the hose 100 is connected by a clamp 102 to a nipple or L 104 which in turn is connected by a union 106 to a control valve 108. The control valve is preferably mounted in an opening in the tubular frame 10, as by means of flexible grommet 110 and has its bonnet 112 extending exteriorly and encircling valve stem 114 upon which hand grip 116 is mounted. The valve is preferably a needle valve to accommodate adjustment of the rate of flow therethrough with high accuracy. A union 118 connects the valve 108 with the T 54 in the air or gas supply line 50.

I have found that the results achieved in the practice of the method may vary with the frequency of vibration produced by the rotation of the eccentric 82, 84 as controlled by the setting of the valve 108, and I have further found that the nature of the material constituting the pulverant bed 46 may require variation of the frequency of vibration as compared to a frequency found suitable for a different pulverant material. Also, I have found that different conditions of operation make available different frequencies of vibration of the same apparatus, and that it is therefore desirable to operate any given device at one of a number of predetermined frequencies. Simple means for indicating the attainment of a selected frequency can be provided in the device and are illustrated in FIG. 2. An elongated upright bracket member, such as metal angle member 120, is fixedly mounted upon the dip tank 40 at the exterior thereof and preferably extends in a vertical position. A pair of spaced tabs 122 and 124 may be struck from one of the flanges of the member 120 and each provided with a central aperture to slidably receive therein an elongated wire member 126 which mounts a small weight 128 at its free upper end. One of the flanges of the member 120 is provided with a plurality of apertures 130 therein spaced at selected intervals along its length below the lowermost tab 124. The lower end of the wire 126 is preferably bent in a loop at 132 and terminates in an end portion 134 insertable through a selected one of the apertures 130 to control the adjustment or setting of the wire 126 in the support 120 and to control the spacing of the weight 128 from the uppermost wire support or tab 122. It will be apparent that the device constitutes a simple calibrated vibrating reed whose vibrating characteristics depend upon its setting and provide means indicating the occurrence of or achievement of a desired frequency of vibration incident to variation of the rate of vibration, as by change of the setting of the valve 108 by the hand wheel 116 thereof. It will be understood, of course, that while the pneumatic vibrating means is shown, any other type of adjustable vibrating means found suitable may be employed.

A slight modification is illustrated in FIG. 4 wherein parts similar to those shown in FIGS. 1 and 3 bear the same reference numerals. In this construction the part 18' of the carrier has reduced thickness upper part 32' formed integrally therewith and defining a shoulder therein at 140 upon which is supported an annulus 142 whose width is such as to project slightly inwardly relative to the inner circumference of the carrier part 18' to support the lower end of dip tank tube 40, and also to support the margin of the air diffusing plate or membrane 44. In this construction the resilient ring 34' within the upper carrier part 32' and encircling the lower portion of the dip tank tube 40, may be interrupted at spaced points. At each interruption an elongated leaf spring 144 may be anchored to the carrier wall 32' as by a rivet or like means 146. The elongated spring 144 projects above the level of the upper end of the carrier part 32' and preferably terminates in an outturned grip portion 148. A stud 150 is fixedly secured to the dip tank wall in any suitable manner to project outwardly therefrom and the upper portion of each leaf spring 144 may be provided with an aperture to fit snugly upon each projecting stud 150. This construction provides means for readily releasably anchoring the tank 40 to the unit in a manner to accommodate relative vibration of these parts through the medium of the leaf springs 144.

The method of utilizing a fluidized bed of finely divided particles of solid dry material in a process of coating articles immersed therein while heated to a temperature above the melting point of the solid material has been known and widely practiced. Such process has many advantages, particularly when utilized to coat articles of irregular contour which are difficult to coat uniformly by other processes, such as spraying, dipping or brushing with liquid coating materials. The process is characterized by providing a container for the finely divided dry solid material which has a porous base characterized by small pore size and uniform permeability. Air under pressure is passed through the porous base and flows upwardly through the bed of finely divided particles of solid material in a manner to reduce the density of this bed of material and thereby impart properties of fluidity thereto which admit immersion of an article to be coated therein similarly to the manner in which a liquid coating material permits immersion of articles therein. The article so immersed having previously been heated above the melting point of the solid material melts the particles of the coating material with which it comes in contact, causing the same to adhere or bond thereto at a substantially uniform rate throughout the entire surface thereof regardless of the contour of that surface. The thickness of the coating will depend in part upon the length of time the article is immersed therein, although increases in thickness of the coating are not directly proportional to the length of time of immersion but tend to decrease rapidly due to the insulating properties of the coating as it is formed and increases in thickness.

Two problems have been encountered with this method. The first of these problems is a tendency of the bed to lack uniform density as a result of inequality of the rate of flow of gas therethrough at all points thereof. Any tendency of a diffusing membrane to permit passage of more gas through selected points or sections thereof than through the remaining parts thereof produces channeling of the bed characterized by lesser density at channeled portions or passages through the bed than at remaining portions. Such channeling further results in a tendency of the upper surface of the bed to exhibit characteristics which may be likened to bubbling or to a geyserlike action in which finely divided material is blown into the air above the surface of the bed. This characteristic of channeling and bubbling is undesirable by reason of the fact that it detracts from assured uniformity of coating of an article dipped therein and thereby prevents the achievement of reproducible coating results.

A second undesirable characteristic of prior fluidized bed practices has been experienced in cases where air or other gas forced through the bed has contained moisture delivered to the material of the bed and has tended to cause the same to cake or solidify. This has occurred in a manner which has destroyed the fine division of the solid coating material with the result that the coating on the immersed article lacks uniformity where moisture adhered particles become bonded to the article dipped in the bed.

I have found that it is possible to provide a method and an apparatus for overcoming both of these prior difficulties. Thus I have found that it is possible to avoid channeling of the bed and bubbling of its surface by vibrating the bed as gas is being diffused therethrough. The vibrations should preferably have a component of movement in a direction transverse of the direction of gas flow. Thus, in the usual bed, air or gas is directed upwardly therethrough and in such event the vibration of the bed should have a horizontal component. The rate of vibration may be calibrated with respect to the rate of gas flow or dispersion through the bed and, when properly so calibrated or controlled, I have found that a second result occurs in addition to the stabilization of the bed to avoid channeling or bubbling thereof, namely, an increase in the volume of the bed. In other words, I have found that, whereas a bed of finely divided material will reduce in density and increase in volume so as to elevate its top surface incident to flow of diffused gas therethrough at a selected rate, a further increase in the volume of the bed elevating the level of the top surface of the bed within the container occurs when vibration is imparted to the material at a rate correlated with the rate of gas flow even though the rate of gas flow remains constant. This reduction in density of the fluidized bed and stabilization of the fluidized bed improves its fluidity, reduces the resistance of the bed to immersion of solid articles therein and increases the uniformity of the coating bonded to the immersed article.

I have also found that it is possible to avoid the caking of the finely divided material by passing the air or gas through a porous member containing a desiccant capable of abstracting moisture from the air or gas prior to the time that air or gas is passed through the porous wall of the tank or container of the finely divided coating material.

The apparatus described above is particularly well suited for carrying out this improved method. Thus it will be observed that the supply of gas and its rate of flow can be accurately controlled and regulated by the regulator 58, and the maintenance of the selected rate of flow can be checked or observed at the gauge 68. The air or gas is discharged into the carrier 18, 22 for the dip tank through the nipple 76 into a chamber in that cup-shaped carrier below the screen 26. This chamber is defined in part by the desiccant container 28 which preferably has a substantially uniform density throughout, and consequently the desiccant container serves as a means to equalize the pressure of the gas or air adjacent the inlet throughout the entire cross-sectional area of the carrier and thus insures that the entire area of the desiccant container or its volume will be effective for the purpose of absorbing moisture from the air or gas before it reaches the diffusing membrane 44 spaced above the desiccant container 28. The air or gas which emerges from the desiccant container is prevented from escaping around the dip tank 40 by the sealing ring 32 in the FIG. 1 construction, and by the sealing ring 142, preferably formed of rubber or rubberlike material, in the FIG. 4 construction. The air previously diffused by the desiccant container is further diffused by the porous membrane 44 and thence passes substantially uniformly through the bed of finely divided material 46. Regardless of such diffusion of the air by both the desiccant container 28 and the porous membrane 44, however, it is observed that channeling of the pulverant or finely divided coating material will occur if the vibrator 82, 84 is not operated.

Operation of the vibrator 82, 84 to control the frequency of vibration of the carrier and of the dip tank mounted thereon is effected by controlling the rate of rotation of the eccentric vibrator element 82. In the present construction this is accommodated by adjusting the setting of the valve 108. As vibration occurs, the level of the top surface of the bed 46 increases, channeling and bubbling of the bed reduce and then terminate when a proper frequency of vibration is achieved. This results in the provision of a continuous substantially flat or level top surface of the bed of finely divided material 46.

I have found that the rate of vibration required in any given apparatus may vary, depending upon the rate at which gas is diffused through the bed and upon the character of the material forming the bed, upon the size and weight of the apparatus, and possibly upon other factors. Thus in any given apparatus, I have found that selected rates of vibration give best results under different combinations of conditions. Hence, it is desirable to provide means for indicating when any one of a group of selected rates of vibration is achieved. Such means are illustrated in FIG. 2 in which each of the openings 130 may be calibrated with respect to rate of vibration. I have also found that the rate of vibration correlated to a given rate of gas flow through a given finely divided material may differ for different apparatus. Thus the size and mass of the apparatus are important determinations, and in general the rate of vibration required for a given set of conditions usually reduces progressively as the size and mass of the apparatus increases. Thus I have found that vibration at a frequency of 750 cycles per minute may be sufficient for a given set of conditions when applied to material contained in a large tank, whereas the same results may require vibration at a frequency in the order of 4500 cycles per minute for small tanks.

My improved method has been found to be well suited for use with many resinous materials, both of the thermoplastic and thermosetting types. Illustrative thermoplastic powders which may form the bed include polyethylene, polypropylene, nylon, polyvinyl chloride-acetate copolymers, cellulose acetate butyrate or polytetrafluoroethylene. Thermosetting materials useful in the practice of the process include saturated and unsaturated polyesters, epoxy resins of the bisphenol-A reaction products with epichlorohydrin, novolac type peracetic acid type epoxy resins and silicone resins. In fact it may be said that all plastic materials are suitable for use by this process as long as they are fusible at the time of dipping and coalescing on the coated part. A further requirement is that the particles must not only be a solid but must also be friable and must not agglomerate during storage.

EXAMPLE 1

One example of a method entails use of an apparatus having a dip tank with an inner diameter of 10¼ inches, an inner depth of tank of 10¾ inches, an overall height of the apparatus of 19 inches, a base diameter of the apparatus of 14 inches, an operating capacity of 3.8 gallons, and approximate weight of 26 pounds. Steel bars 4⅛ inches long, 1½ inch wide, and 3/16 inch thick were heated to a temperature of 195 deg. C., and then immersed in a fluidized bed in said apparatus consisting of an epoxy resin of the bisphenol-A reaction product with epichlorohydrin and pigments and fillers wherein said epoxy resin constituted in excess of 86% by weight, and said fillers and pigments constituted less than 14% by weight. The dip tank of the apparatus was vibrated at a frequency of 3500 cycles per minute and air was supplied at 15 p.s.i. to fluidize the bed to readily accept the steel bar when dipped therein and to maintain a stable density and a substantially smooth upper bed surface. The bar was immersed for three seconds, and the thickness of the film produced thereon was .0115 inch, as measured after heating of the coated sample for thirty minutes at 200 deg. C. to complete the polymerization reaction of the coating composition.

Other tests were performed using the same apparatus, the same coating material and bars of the same size and revealed that immersion of a bar heated at 195 deg. C. for four seconds produced a film thickness of .0155 inch after completion of the polymerization reaction of the coating composition. Similarly, immersion of a bar of the same apparatus for five seconds produced, after completion of the polymerization reaction of the coating composition, a film thickness of .0180 inch. Another bar of the same size heated to the same temperature, dipped in the same bed of fluidized coating material in the same apparatus for six seconds, produced, after completion of the polymerization reaction of the coating composition, a film thickness of .0195 inch.

In all of the tests mentioned above, the epoxy resin was divided to a fineness characterized by retention of five percent thereof by weight, on a screen having a mesh of U.S. No. 70; 31% by weight on a screen having a mesh of U.S. No. 100; 61% thereof on a screen having a mesh of U.S. No. 140; 2.5% thereof on a screen having a mesh of U.S. No. 200; 2.5% thereof on a screen having a mesh of U.S. No. 270; and 2.5% thereof in the pan.

EXAMPLE 2

Another method example entails the use of an apparatus having a dip tank with an inner diameter of 3½ inches, an inner depth of dip tank of 5¼ inches, an overall height of apparatus of 12 inches, a base diameter of apparatus of 6¾ inches, an operating capacity of one-fourth gallon, and approximate weight of eight pounds. Steel bars 4⅛ inch long, 1¼ inch wide, and 3/16 inch thick were heated to a temperature of 300 deg. C. and then immersed in a fluidized bed in said aparatus consisting of dry powdered cellulose acetate butyrate and pigment having a particle size capable of passing through a 60 mesh screen. The dip tank of the apparatus was vibrated at a frequency of 3000 cycles per minute and air was supplied at 10 p.s.i. to fluidize the bed of coating material in a manner to maintain a stable density and produce a substantial smooth upper surface of said bed. The bar was immersed for five seconds, and the thickness of the film produced thereon was 13 mils.

EXAMPLE 3

Another test was made using the same apparatus as that specified above in Example 2 for coating a steel bar of substantially the same dimensions specified in Example 2. The dip tank of the apparatus was provided with a powdered coating material of the polyvinyl chloride acetate type which contained a triphenyl phosphate plasticizer, a dibasic stabilizer and pigment. The particle size of this coating material was such that it would pass through a 20 mesh screen. The bar was heated to 220 deg. C. and was dipped in the dip tank apparatus for four seconds while the apparatus was vibrated at 3000 cycles per minute and while air was supplied to the apparatus at 10 p.s.i. to fluidize the bed to a stable density and provide a substantially smooth upper bed surface. The thickness of the film produced on the bar in this test was 24 mils.

The purpose for which the method is adapted and for which the apparatus may be used is not limited to the coating of heated material with resinous powdered material. Other purposes for which the apparatus is well suited include the coating of patterns with finely divided silica for the preparation of molds for the "lost wax process" of casting metals or other castable materials, and for applying glass frit to metal in preparation for obtaining a procelain enamel coating.

EXAMPLE 4

An example of the practice of a method for preparing molds for the "lost wax process" of casting entails the preparation of a pattern of any meltable or heat destructible material commonly used in the "lost wax process." This pattern is then coated with a material such as polyvinyl acetate in a solvent such as acetone, or rubber latex or any other material which will burn without leaving a residue. The pattern so coated is then dipped in a fluidized bed of finely divided silica in apparatus of a suitable character such as apparatus of the type described in Examples 1, 2 and 3. The silica forming the bed preferably constitutes ball milled silica sand containing a titanium pigment and one to ten percent of colloidal silica. Air is supplied to the apparatus such as that used in Example 2 at the rate of 10 p.s.i., and the apparatus is vibrated at a rate of approximately 3000 cycles per minute for three or four seconds. The pattern so coated with finely divided silica may then be coated with or imbedded in a slurry or paste of silica of any suitable thickness, as in a flask. When the slurry sets, the flask may be heated to melt the pattern and destroy the coating, thereby leaving a molding cavity in the flask.

Other modifications and variations of the apparatus and method are possible in the light of the foregoing disclosure, and it is understood that the invention may be practiced otherwise than is specifically described if within the scope of the appended claims.

I claim:

1. A coating device comprising a frame, a cup-shaped carrier open at its upper end, resilient means on said frame for supporting said carrier, means to supply gas under pressure to said carrier, means to vibrate said carrier, a tubular dip tank open at its top and having a porous base adapted to support a bed of finely divided coating material and to accommodate flow of gas through said base and bed, said tank being removably mounted on and spanning the upper part of said carrier, and means for sealing the connection between said carrier and tank, said vibration occurring uniformly throughout said bed in a direction transverse of the flow of gas through said tank.

2. A coating device as defined in claim 1 wherein said sealing means constitutes a resilient gasket supported by said carrier and supporting said tank, and resilient releasable means connecting said tank and carrier.

3. In combination, a frame, a carrier having a chamber and yieldably mounted on said frame, a dip tank removably mounted on said carrier with a sealed fit and having a porous base separating said tank from said carrier chamber and adapted to support a bed of finely divided solid material, means for discharging gas under pressure through said porous base and bed, and means located exteriorly on said carrier for vibrating said carrier, tank and bed substantially horizontally and uniformly, said carrier having a bottom and a tubular portion having a shoulder intermediate its height for supporting said tank, said gas discharge means being connected to the bottom of said carrier.

4. In combination, a frame, a hollow carrier yieldably mounted on said frame, a dip tank removably mounted on said carrier with a sealed fit and having a porous base spanning said carrier and adapted to support a bed of finely divided solid material, means for discharging gas under pressure into said carrier and through said porous base and bed, means mounted exteriorly on said carrier for vibrating substantially uniformly throughout said carrier, tank and bed in a direction having a horizontal component, said carrier having a bottom and a tubular portion having a shoulder intermediate its height for supporting said tank, said gas discharge means being connected to the bottom of said carrier, and a porous flexible container for a desiccant resting on the bottom of said carrier and substantially spanning the tubular portion thereof.

5. A fluidized bed device comprising a frame, a dip tank shiftably mounted on said frame and having a porous base adapted to support a bed of finely divided solid material, means for directing gas under pressure substantially uniformly through said base and bed, and means for vibrating said tank and bed substantially horizontally and uniformly, said dip tank comprising an upper tubular part and a lower cup-shaped part, said vibrating means being connected exteriorly to said lower tank part, said upper tubular part mounting said porous base, and a supporting ring carried by said lower tank part and surrounding the lower part of said upper tank part with a loose fit, and a resilient packing ring therebetween.

6. In combination, a frame, a carrier mounted on said frame and defining a chamber, a dip tank removably mounted on said carrier with a sealed fit and having a porous base spanning said chamber and adapted to support a bed of finely divided solid material, means for discharging gas under pressure into said chamber and through said porous base and bed, and means mounted on said carrier for vibrating said tank and bed uniformly throughout and substantially horizontally, said frame constituting a tube having a resilient carrier support intermediate its height, and resilient bumper means positioning said carrier with clearance in said frame.

7. In combination, a frame, a carrier mounted on said frame and defining a chamber, a dip tank removably mounted on said carrier with a sealed fit and having a porous base spanning said chamber and adapted to support a bed of finely divided solid material, means for discharging gas under pressure into said chamber and through said porous base and bed, and means mounted on said carrier for vibrating said tank and bed uniformly throughout and substantially horizontally, said carrier being tubular, and a resilient lining in said tubular carrier embracing the lower portion of said dip tank.

References Cited by the Examiner

UNITED STATES PATENTS

| | | | |
|---|---|---|---|
| 2,094,786 | 10/1937 | Flint | 34—38 |
| 2,310,894 | 2/1943 | Brusset | 209—467 |
| 2,478,940 | 8/1949 | Pape | 117—16 |
| 2,644,769 | 7/1953 | Robinson | 117—17 |
| 2,750,681 | 6/1956 | Berry | 34—57 |
| 2,795,318 | 6/1957 | Morris | 198—220 |
| 2,815,550 | 12/1957 | Valyi | 22—10 |
| 2,844,489 | 7/1958 | Gemmer | 117—20 |
| 2,900,817 | 8/1959 | Grindle et al. | 73—70.2 |
| 2,919,160 | 12/1959 | Blackburn | 302—57 |
| 2,969,038 | 1/1961 | Neumann | 118—429 |

OTHER REFERENCES

Plastverarbeiter: pp. 342–348, September 1956.

WILLIAM D. MARTIN, *Primary Examiner.*

RICHARD D. NEVIUS, JOSEPH B. SPENCER,
*Examiners.*